United States Patent
Lin et al.

(10) Patent No.: US 7,034,086 B2
(45) Date of Patent: Apr. 25, 2006

(54) MELAMINE AND GUANAMINE-BASED CROSSLINKING COMPOSITION

(75) Inventors: Lon-Tang Wilson Lin, Bethel, CT (US); William Jacobs, III, Bethel, CT (US); Dimitri Verhage, Krimpen aan den Ijssel (NL); Kuang-Jong Wu, Easton, CT (US)

(73) Assignee: Cytec Technology Corp., Wilmington, DE (US)

( * ) Notice: Subject to any disclaimer, the term of this patent is extended or adjusted under 35 U.S.C. 154(b) by 202 days.

(21) Appl. No.: 10/403,442

(22) Filed: Mar. 31, 2003

(65) Prior Publication Data
US 2004/0198908 A1 Oct. 7, 2004

(51) Int. Cl.
C08C 19/22 (2006.01)
C08F 8/00 (2006.01)

(52) U.S. Cl. ............. 525/375; 554/180; 554/194; 554/196; 554/205; 525/381; 525/385

(58) Field of Classification Search .......... 554/180, 554/194, 196, 205; 525/375, 381, 385
See application file for complete search history.

(56) References Cited

U.S. PATENT DOCUMENTS

| | | | |
|---|---|---|---|
| 3,806,508 A | 4/1974 | Weinrotter et al. | 260/249.6 |
| 4,180,488 A | 12/1979 | Stern et al. | 260/21 |
| 4,454,133 A | 6/1984 | Berke et al. | 424/267 |
| 4,789,707 A | 12/1988 | Nishimura et al. | 525/157 |
| 2004/0024131 A1 | 2/2004 | Borner et al. | 525/254 |

FOREIGN PATENT DOCUMENTS

| | | | |
|---|---|---|---|
| DE | 2105783 | * | 9/1972 |
| EP | 0 429 830 A2 | | 3/1995 |
| FR | 2124966 | * | 9/1972 |
| WO | WO 97/11119 | * | 3/1997 |

OTHER PUBLICATIONS

J. G. Frick, Jr., and R. J. Harper, Jr., "Investigations Toward Formaldehyde–Free Finishes," Feb. 1982, pp 141–148.

* cited by examiner

Primary Examiner—Helen L. Pezzuto
(74) Attorney, Agent, or Firm—Morgan, Lewis & Bockius LLP

(57) ABSTRACT

This invention relates to a crosslinking composition comprising a compound having the structure of Formula I:

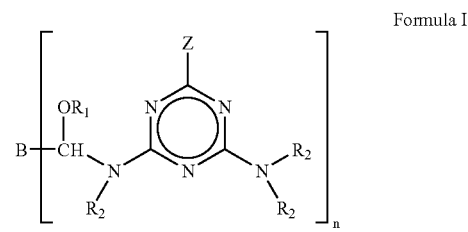

Formula I where Z is a hydrogen, an alkyl of 1 to about 18 carbon atoms, an aryl of about 6 to about 24 carbon atoms, an aralkyl of about 7 to about 24 carbon atoms, or —NR$_2$R$_2$; each R$_2$ is independently hydrogen, an alkyl, aryl or an aralkyl of 1 to about 18 carbon atoms or R$_3$; where R$_3$ is —CHROR$_1$ or

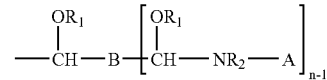

where R is alkyl, halogenated alkyl, aryl, aralkyl, halogenated aralkyl, alkoxyalkyl or an alkaryl having from 1 to about 24 carbon atoms; R$_1$ is a hydrogen, alkyl, aryl, aralkyl, alkoxyalkyl or an alkaryl having from 1 to about 24 carbon atoms; and where the alkyl or aryl groups in each radical may optionally have heteroatoms in their structure; B is a residue of a poly(alkylaldehyde) with n aldehyde groups; n is an integer of 2 to about 4; and A is an amino moiety derived from the group consisting of guanamine and melamine. The above composition may be prepared by reacting a melamine or guanamine with a mono(alkylaldehyde), a poly(alkylaldehyde) and an alcohol.

19 Claims, No Drawings

US 7,034,086 B2

MELAMINE AND GUANAMINE-BASED CROSSLINKING COMPOSITION

FIELD OF THE INVENTION

The invention is directed to melamine and/or guanamine-based crosslinking compositions and their method of preparation. In particular, the invention relates to melamine and/or guanamine-based crosslinking compositions, which are prepared by reacting melamine and/or guanamine with mono(alkylaldehydes), poly(alkylaldehydes) and/or alcohols.

BACKGROUND OF THE INVENTION

Traditional industrial coatings have for years been based in significant part on backbone resins having active hydrogen groups crosslinked with various derivatives of amino-1,3,5-triazines. Most notable among the amino-1,3,5-triazine derivatives are the aminoplasts such as the alkoxymethyl derivatives of melamine and guanamines which, while providing excellent results in a number of aspects, have the disadvantage of releasing formaldehyde as a volatile by-product under curing conditions and requiring relatively high temperatures to adequately crosslink the film.

Despite the excellent film coating properties, which can be achieved with aminoplast crosslinked systems, the coatings industry is under great pressure to reduce the environmentally undesirable emission of formaldehyde. In addition, high temperature crosslinking systems require more energy to cure and/or crosslink slower resulting in less throughput. As a result, it has long been a desire of industry to find acceptable alternative crosslinkers and coatings systems, which emit no formaldehyde or low amounts of formaldehyde and cure at lower temperatures.

U.S. Pat. Nos. 3,806,508 and 4,180,488 disclose the preparation of resins prepared by reacting melamine with a mono(alkylaldehyde) and an alcohol. However, neither patent discloses nor teaches reacting melamine with a mono(alkylaldehyde) and a mixture of alcohols.

U.S. Pat. No. 4,454,133 discloses the preparation of antimicrobial compounds prepared by reacting an amide or imide compound with poly(alkylaldehydes) (e.g., glutaraldehyde). However, the patent neither discloses nor teaches reacting a melamine with a mono(alkylaldehyde) and a poly(alkylaldehyde).

SUMMARY OF THE INVENTION

This invention relates to a crosslinking composition comprising a compound having the structure of Formula I:

Formula I

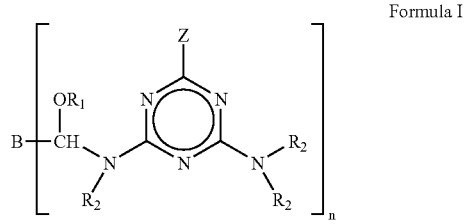

where Z is a hydrogen, an alkyl of 1 to about 18 carbon atoms, an aryl of about 6 to about 24 carbon atoms, an aralkyl of about 7 to about 24 carbon atoms, or —NR$_2$R$_2$; each R$_2$ is independently hydrogen, an alkyl, aryl or an aralkyl of 1 to about 18 carbon atoms or R$_3$; where R$_3$ is —CHROR$_1$ or

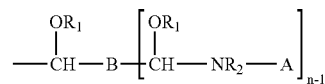

where R is alkyl, halogenated alkyl, aryl, aralkyl, halogenated aralkyl, alkoxyalkyl or an alkaryl having from 1 to about 24 carbon atoms; R$_1$ is a hydrogen, alkyl, aryl, aralkyl, alkoxyalkyl or an alkaryl having from 1 to about 24 carbon atoms; and where the alkyl or aryl groups in each radical may optionally have heteroatoms in their structure; B is a residue of a poly(alkylaldehyde) with n aldehyde groups; n is an integer of 2 to about 4; and A is an amino moiety derived from the group consisting of guanamine and melamine. The above composition may be prepared by reacting a melamine or guanamine with a mono(alkylaldehyde), a poly(alkylaldehyde) and an alcohol.

This invention also relates to a crosslinking composition comprising a compound having the structure of Formula III:

Formula III

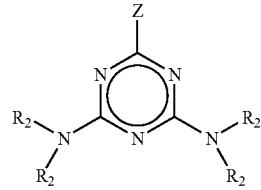

where Z is a hydrogen, an alkyl of 1 to about 18 carbon atoms, an aryl of 6 to about 24 carbon atoms, an aralkyl of 7 to about 24 carbon atoms, or —NR$_2$R$_2$; each R$_2$ is independently hydrogen, an alkyl, aryl or an aralkyl of 1 to about 24 carbon atoms or R$_3$; R$_3$ is —CHROR$_1$; where R$_1$ is hydrogen, alkyl, aryl, aralkyl, or an alkaryl having from 1 to about 24 carbon atoms; and R is an alkyl, halogenated alkyl, aryl, aralkyl, halogenated aralkyl, or an alkaryl having from 1 to about 24 carbon atoms; where the alkyl or aryl groups in each radical may optionally have heteroatoms in their structures and with the provisos that at least some R$_1$ groups are derived from a mixture of two or more alcohols and at least one R$_2$ is R$_3$. The above compound of Formula III may be prepared by reacting a melamine and/or guanamine with a mono(alkylaldehyde) and two or more alcohols.

DETAILED DESCRIPTION OF THE INVENTION

In the present invention, the term "mono(alkylaldehyde)" is an aldehyde having the general formula: R—CHO, where R is alkyl, halogenated alkyl, aryl, aralkyl, halogenated aralkyl, alkoxyalkyl or an alkaryl, having from 1 to about 24 carbon atoms, or about 1 to 12 carbon atoms, or about 1 to 4 carbon atoms.

The term "poly(alkylaldehyde)" is an aldehyde having the general formula: B—[—CHO]$_n$, where B is a organic residue of a poly(alkylaldehyde) with n aldehyde groups and n is an integer of 2 to about 8. A non-limiting example of a poly(alkylaldehyde) is glutaraldehyde having the structure OHC—(CH$_2$)$_3$—CHO, where B is —(CH$_2$)$_3$— and n is equal to 2.

The term "and/or" means either or both. For example, "A and/or B" means A or B, or both A and B.

This invention relates to a crosslinking composition comprising a compound having the structure of Formula I:

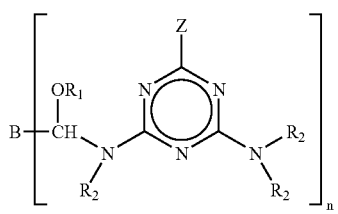

where Z is a hydrogen, an alkyl of 1 to about 18 carbon atoms, an aryl of about 6 to about 24 carbon atoms, an aralkyl of about 7 to about 24 carbon atoms, or —NR$_2$R$_2$; each R$_2$ is independently hydrogen, an alkyl, aryl or an aralkyl of 1 to about 18 carbon atoms or R$_3$; where R$_3$ is —CHROR$_1$ or

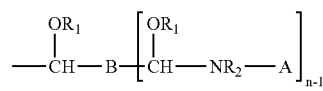

where R is alkyl, halogenated alkyl, aryl, aralkyl, halogenated aralkyl, alkoxyalkyl or an alkaryl having from 1 to about 24 carbon atoms; R$_1$ is a hydrogen, alkyl, aryl, aralkyl, alkoxyalkyl or an alkaryl having from 1 to about 24 carbon atoms; and where the alkyl or aryl groups in each radical may optionally have heteroatoms in their structure; B is a organic residue of a poly(alkylaldehyde) with n aldehyde groups; n is an integer of 2 to about 8; and A is an amino moiety derived from the group consisting of guanamine and melamine.

The above composition may be prepared by reacting a melamine and/or guanamine with a mono(alkylaldehyde), a poly(alkylaldehyde) and an alcohol in a one-step or multi-step process. In one embodiment of a multi-step process, the melamine and/or guanamine is first reacted with the mono (alkylaldehyde) and poly(alkylaldehyde). The resulting reaction product is then reacted with the alcohol to form the crosslinking composition.

Generally, one —NH group from the melamine or guanamine reacts with an aldehyde group in the mono- or poly(alklyaldehydes) as set for below.

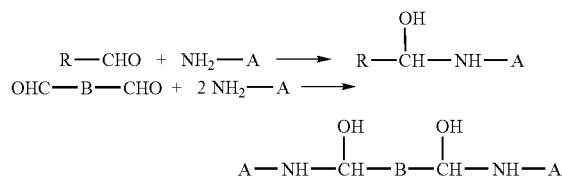

where A and R are defined above

During the etherification reaction, the hydroxyl groups may be etherified by the reacting alcohol (R$_1$—OH).

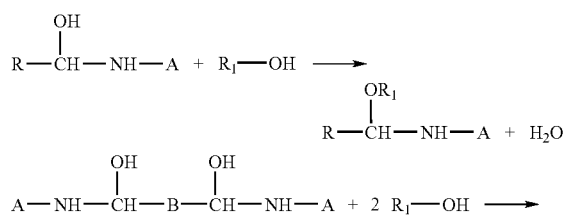

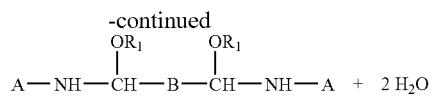

In this application, A would typically have the structure:

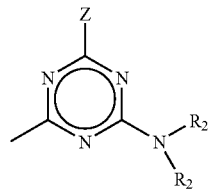

where Z and R$_2$ are defined above.

It should be noted that more than one poly(alkylaldehyde) could react with a melamine and/or guanamine resulting in an oligomer. The term "oligomer" in this application means a compound having 2 or more melamine and/or guanamine moieties. Preferably, the oligomer has a number average molecular weight of from about 500 to about 5000, or about 500 to about 3000, or about 500 to about 2000.

In the above structure of Formula I, is it theoretically possible that the mono and poly(alklyaldehydes) would have six possible active sites to react with the melamine. However, it is believed that practically there would be one reactive site for each nitrogen atom off the triazine ring. In that case, the resulting crosslinking composition would comprise compounds having the structure of Formula II:

Formula II

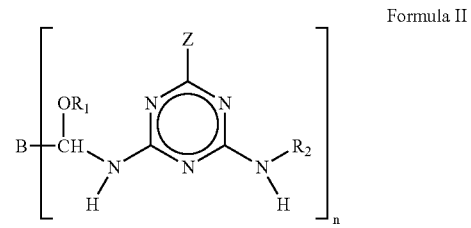

where Z, B, R$_1$ and R$_2$ are defined above.

Preferably for Formulas I and II, Z is —NHR$_2$, an alkyl of 1 to about 8 carbon atoms or an aryl of 6 to about 24 carbon atoms; R is C$_1$ to C$_8$ alkyl; R$_1$ is a C$_1$ to C$_8$ alkyl or a C$_1$ to C$_8$ alkoxyalkyl; B is methylene, ethylene, propylene or a structure of the formula:

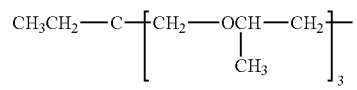

which is the 1,4 Michael addition of crotonaldehyde with trimethylolpropane. Similarly, one may use the reaction product of crotonaldehyde and polyhydritic alcohols, such as glycerol, pentaerythritol, sorbitol, 1,4-butanediol, sugars, starches, cellulose and the like; or adducts and polymers of α,β-unsaturated aldehydes.

Also preferably, R$_1$ is derived from an alcohol selected from the group consisting of: methanol, ethanol, propanol, isopropanol, butanol, isobutanol, cyclohexanol, phenol, benzyl alcohol, monoalkyl ether of ethylene or propylene glycol and mixtures thereof. More preferably, R$_1$ is derived from methanol, butanol, monomethyl ether of ethylene glycol or monomethyl ether of propylene glycol.

In addition, it is also preferred that about 10% to about 90% of the R$_2$ groups, or about 15% to about 70%, or about 30% to about 50% of the R$_2$ groups on a molar basis are —CHROR$_1$.

As described above, the general process for preparing the crosslinking compositions containing compounds of Formulas I and II comprises reacting a melamine and/or guanamine with a mono(alkylaldehyde), a poly(alkylaldehyde) and an alcohol.

Non-limiting examples of mono(alkylaldehyde) that may be used in the reaction are acetaldehyde, propionaldehyde, n-butyraldehyde, isobutyraldehyde, valeraldehyde, chloral, caproaldehyde, octylaldehyde, acrolein, crotonaldehyde and mixtures thereof.

Non-limiting examples of poly(alkylaldehyde) that may be used in the reaction are glutaraldehyde; the reaction products of crotonaldehyde and polyhydritic alcohols, such as glycerol, trimethylolpropane, pentaerythritol, sorbitol, 1,4-butanediol, sugars, starches, cellulose and the like; or adducts and polymers of α,β-unsaturated aldehydes.

Non-limiting examples of alcohols that may be used in the reaction are methanol, ethanol, propanol, isopropanol, butanol, isobutanol, cyclohexanol, phenol, benzyl alcohol, monoalkyl ether of ethylene or propylene glycol and mixtures thereof.

In the above reaction, the molar ratio of amino groups in the melamine and/or guanamine to mono(alkylaldehyde) is about 1:0.1 to about 1:30, or about 1:0.25 to about 1:10 or about 1:0.5 to about 1:5. In this application "amino groups" include groups with primary and/or secondary amines, i.e., —$NH_2$ and —NHR groups respectively.

In addition, the molar ratio of amino groups in the melamine and/or guanamine to aldehyde groups in the poly(alkylaldehyde) is about 0.1:1 to about 50:1, or about 0.5:1 to about 25:1 or about 1:1 to about 10:1.

The molar ratio of aldehyde groups in the mono(alkylaldehyde) and poly(alkylaldehyde) to alcohol is about 1:0.2 to about 1:50, or about 1:0.5 to about 1:25 or about 1:1 to about 1:10.

The above reaction may be prepared in a one-step or multi-step process. In one embodiment of a multi-step reaction, the melamine and/or guanamine are first reacted with the mono(alkylaldehyde) and/or poly(alkylaldehyde) compounds, (alkylolation reaction) and the etherification step would occur by the reaction with the alcohol. In another embodiment of a multistep reaction, the melamine and/or guanamine are first reacted with the mono(alkylaldehyde) followed by etherification with the alcohol, and then reacted with the poly(alkylaldedyde) followed by another etherification step with the alcohol. In a further embodiment of a multistep reaction, the melamine and/or guanamine are first reacted with the poly(alkylaldehyde) followed by etherification with the alcohol, and then reacted with the mono(alkylaldedyde) followed by another etherification step with the alcohol.

The alkylolation reaction is preferably conducted in the presence of a catalyst. An acid or base catalyst may be used. Non-limiting examples of acid catalysts are: p-toluenesulfonic acid, sulfuric acid, glacial acetic acid, mono or polychlorinated acetic acids, sulfuric acid, nitric acid, napthylenesulfonic acid, alkyl phosphonic acids, phosphoric acid and formic acid. Non-limiting examples of base catalysts are inorganic basic salts such as the hydroxides, carbonates or bicarbonates of lithium, sodium, potassium, calcium and magnesium, or the organic bases and basic salts such as amines and guanidine, quaternary-ammonium, phosphonium hydroxide and (bi-)carbonate salts.

The etherification reaction is preferably conducted in a presence of an acid catalyst. The same acid catalysts described above for the alkylolation reaction may also be used in the etherification reaction.

The process for preparing the composition is carried out at a temperature from about 0° C. to about 125° C., or about 25° C. to about 100° C. or about 50° C. to about 75° C. for a time of about 0.5 hours to about 48 hours, or about 1 hour to about 24 hours or about 1 hour to about 12 hours.

This invention also relates to a crosslinking composition comprising a compound having the structure of Formula III:

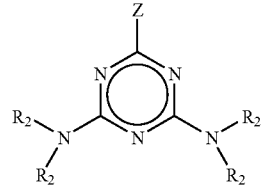

Formula III where Z is a hydrogen, an alkyl of 1 to about 18 carbon atoms, an aryl of 6 to about 24 carbon atoms, an aralkyl of 7 to about 24 carbon atoms, or —$NR_2R_2$; each $R_2$ is independently hydrogen, an alkyl, aryl or an aralkyl of 1 to about 24 carbon atoms or $R_3$;

$R_3$ is —$CHROR_1$; where $R_1$ is hydrogen, alkyl, aryl, aralkyl, or an alkaryl having from 1 to about 24 carbon atoms; and R is an alkyl, halogenated alkyl, aryl, aralkyl, halogenated aralkyl, or an alkaryl having from 1 to about 24 carbon atoms; where the alkyl or aryl groups in each radical may optionally have heteroatoms in their structure and with the provisos that at least some $R_1$ groups are derived from a mixture of two or more alcohols and at least one $R_2$ is $R_3$. In one embodiment, one $R_2$ group off each nitrogen is hydrogen.

The phrase "derived from a mixture of two or more alcohols" means that compound of Formula III in the composition will have at least two different $R_1$ alkyl groups because the reaction is charged with two or more alcohols during the etherification reaction(s).

Preferably for Formula III, Z is —$NHR_2$, an alkyl of 1 to about 8 carbon atoms or an aryl of 6 to about 24 carbon atoms; R is $C_1$ to $C_8$ alkyl; $R_1$ is a $C_1$ to $C_8$ alkyl or a $C_1$ to $C_8$ alkoxyalkyl.

Also preferably, $R_1$ is derived from two or more alcohols selected from the group consisting of: methanol, ethanol, propanol, isopropanol, butanol, isobutanol, cyclohexanol, phenol, benzyl alcohol, monoalkyl ether of ethylene or propylene glycol and mixtures thereof. More preferably, $R_1$ is derived from two or more of methanol, butanol, monomethyl ether of ethylene glycol or monomethyl ether of propylene glycol.

In addition, it is also preferred that about 10% to about 90% of the $R_2$ groups, or about 15% to about 70%, or about 30% to about 50% of the $R_2$ groups on a molar basis are —$CHROR_1$.

As described above the general process for preparing the crosslinking compositions containing compounds of Formula III comprising reacting a melamine and/or guanamine with a mono(alkylaldehyde) and two or more alcohols.

Non-limiting examples of mono(alkylaldehyde) that may be used in the reaction are acetaldehyde, propionaldehyde, n-butyraldehyde, isobutyraldehyde, valeraldehyde, chloral, caproaldehyde, octylaldehyde, acrolein and crotonaldehyde.

Non-limiting examples of alcohols that may be used in the reaction are methanol, ethanol, propanol, isopropanol, butanol, isobutanol, cyclohexanol, phenol, benzyl alcohol, monoalkyl ether of ethylene or propylene glycol and mixtures thereof.

In the above reaction, the molar ratio of amino groups in the melamine and/or guanamine to mono(alkylaldehyde) is about 1:0.1 to about 1:30, or about 1:0.25 to about 1:10 or about 1:0.5 to about 1:5.

The molar ratio of aldehyde groups in the mono (alkylaldehyde) to alcohol is about 1:0.2 to about 1:50, or about 1:0.5 to about 1:25 or about 1:1 to about 1:10.

The above reaction may be also be prepared in a one-step or multi-step process. Preferably, the reaction is a multi-step reaction where the melamine and/or guanamine are first reacted with the mono(alkylaldehyde) compound (alkylolation reaction) and the etherification step would occur by the reaction with two or more alcohols. In another embodiment, the etherification reaction step would be a two-step process (e.g., a trans-etherification process) as illustrated in Example 1 below.

The alkylolation reaction is preferably conducted in the presence of a catalyst. Preferably, the catalyst is an acid or base catalyst. Non-limiting examples of acid catalysts are p-toluenesulfonic acid, sulfamic acid, glacial acetic acid, mono or polychlorinated acetic acids, mono or polyhalogenated acetic acids, sulfuric acid, nitric acid, napthylene-sulfonic acid, alkyl phosphonic acids, phosphoric acid and formic acid.

Non-limiting examples of base catalysts are inorganic basic salts such as the hydroxides, carbonates or bicarbonates of lithium, sodium, potassium, calcium and magnesium, or the organic bases and basic salts such as amines and guanidine, quaternary-ammonium, phosphonium hydroxide and (bi-)carbonate salts.

The etherification reaction is preferably conducted in a presence of an acid catalyst. The same acid catalysts described above for the alkylolation reaction may also be used in the etherification reaction.

The reaction is carried out at a temperature from about 0° C. to about 125° C., or about 25° C. to about 100° C. or about 50° C. to about 75° C. for a time of about 0.5 hours to about 48 hours, or about 1 hour to about 24 hours or about 1 hour to about 12 hours.

In the preparation of the compounds of Formula III, oligomeric products resulting from a self-condensation reaction may be obtained. Non-limiting examples of these self-condensation products are given below in Formulas IV and V.

One embodiment is a crosslinking composition comprising an oligomer compound having the Formula IV:

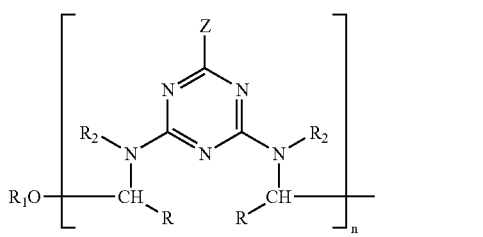

Formula IV where Z is a hydrogen, an alkyl of 1 to about 18 carbon atoms, an aryl of 6 to about 24 carbon atoms, an aralkyl of 7 to about 20 carbon atoms, or —$NR_2R_2$; each $R_2$ is independently hydrogen, an alkyl, aryl or an aralkyl of 1 to about 24 carbon atoms or $R_3$;

$R_3$ is —$CHROR_1$; wherein $R_1$ is hydrogen, an alkyl, aryl, aralkyl, or an alkaryl having from 1 to about 24 carbon atoms and R is an alkyl, halogenated alkyl, aryl, aralkyl, halogenated aralkyl, alkoxyalkyl or an alkaryl having from 1 to 24 carbon atoms; n is 2 to about 50; where the alkyl or aryl groups in each radical may optionally have heteroatoms in their structure and with the provisos that at least some $R_1$ groups are derived from a mixture of two or more alcohols and at least one $R_2$ is $R_3$.

A further embodiment is a crosslinking composition comprising an oligomer compound having the Formula V

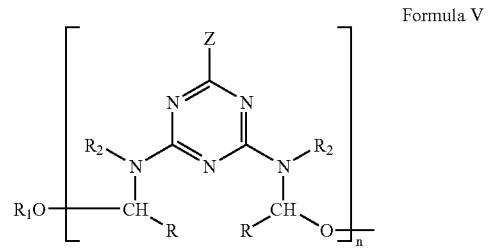

Formula V where Z is a hydrogen, an alkyl of 1 to about 18 carbon atoms, an aryl of 6 to about 24 carbon atoms, an aralkyl of 7 to about 24 carbon atoms, or —$NR_2R_2$; each $R_2$ is independently hydrogen, an alkyl, aryl or an aralkyl of 1 to about 18 carbon atoms or $R_3$; $R_3$ is —$CHROR_1$; wherein $R_1$ is hydrogen, an alkyl, aryl, aralkyl, or an alkaryl, having from 1 to about 24 carbon atoms and R is an alkyl, halogenated alkyl, aryl, aralkyl, halogenated aralkyl, alkoxyalkyl or an alkaryl, having from 1 to about 24 carbon atoms; n is 2 to about 50; where the alkyl or aryl groups in each radical may optionally have heteroatoms in their structure and with the provisos that at least some $R_1$ groups are derived from a mixture of two or more alcohols and at least one $R_2$ is $R_3$.

An important use of the compounds and compositions described herein is based on their ability to act as crosslinking agents in curable compositions, and especially those curable compositions which contain materials or polymers having active hydrogen groups. The crosslinkers of the present invention are capable of crosslinking active hydrogen containing materials or polymers.

The active hydrogen-containing material of the curable compositions preferably contains at least one class of a reactive functionality such as hydroxy, carboxy, amino, amido, carbamato, mercapto, or a blocked functionality which is convertible to any of the preceding reactive functionalities. These active hydrogen-containing materials are those which are conventionally used in aminoresin coatings, and in general are considered well-known to those of ordinary skill in the relevant art.

Suitable active hydrogen-containing materials include, for example, polyfunctional hydroxy group containing materials such as polyols, hydroxyfunctional acrylic resins having pendant or terminal hydroxy functionalities, hydroxyfunctional polyester resins having pendant or terminal hydroxy functionalities, hydroxyfunctional polyurethane prepolymers, products derived from the condensation of epoxy compounds with an amine, and mixtures thereof. Acrylic and polyester resins are preferred. Examples of the polyfunctional hydroxy group containing materials include DURAMAC® 203-1385 alkyd resin (Eastman Chemical Co); BECKSOL® 12-035 Coconut Oil Alkyd (Reichhold Chemical Co. Durham, N.C.); JONCRYL® 500 acrylic resin (S. C. Johnson & Sons, Racine, Wis.); AT-400 acrylic resin (Rohm & Haas, Philadelphia, Pa.); CYPLEX® polyester resin (Cytec Industries, West Paterson, N.J.); CARGILL® 3000 and 5776 polyester resins (Cargill, Minneapolis, Minn.); TONE® polyester resin (Union Carbide, Danbury, Conn.); K-FLEX® XM-2302 and XM-2306 resins (King Industries, Norwalk, Conn.); CHEMPOL® 11-1369 resin (Cook Composites and Polymers (Port Washington, Wis.); CRYLCOAT® 3494 solid hydroxy terminated polyester resin (UCB CHEMICALS USA, Smyrna, Ga.); RUCOTE® 101 polyester resin (Ruco Polymer, Hicksville, N.Y.); JONCRYL® SCX-800-A and SCX-800-B hydroxyfunctional solid acrylic resins (S. C. Johnson & Sons, Racine, Wis.); and the like.

Examples of carboxyfunctional resins include CRYL-COAT® solid carboxy terminated polyester resin (UCB CHEMICALS USA, Smyrna, Ga.). Suitable resins containing amino, amido, carbamato or mercapto groups, including groups convertible thereto, are in general well-known to those of ordinary skill in the art and may be prepared by known methods including copolymerizing a suitably functionalized monomer with a comonomer capable of copolymerizing therewith.

The curable compositions of the present invention may optionally further comprise a cure catalyst. The cure catalysts usable in the present invention include sulfonic acids, aryl, alkyl, and aralkyl sulfonic acids; aryl, alkyl, and aralkyl phosphoric and phosphonic acids; aryl, alkyl, and aralkyl acid pyrophosphates; carboxylic acids; sulfonimides; mineral acids and mixtures thereof. Of the above acids, phosphoric and phosphonic acids are preferred when a catalyst is utilized. Examples of the sulfonic acids include benzenesulfonic acid, para-toluenesulfonic acid, dodecylbenzenesulfonic acid, naphthalenesulfonic acid, dinonylnaphthalenedisulfonic acid, and a mixture thereof. Examples of the aryl, alkyl, and aralkyl phosphates and pyrophosphates include phenyl, para-tolyl, methyl ethyl, benzyl, diphenyl, di-para-tolyl, di-methyl, di-ethyl, di-benzyl, phenyl-para-tolyl, methyl-ethyl, phenyl-benzyl phosphates and pyrophosphates. Examples of the carboxylic acids include benzoic acid, formic acid, acetic acid, propionic acid, butyric acid, dicarboxylic acids such as oxalic acid, fluorinated acids such as trifluoroacetic acid, and the like. Examples of the sulfonimides include dibenzene sulfonimide, di-para-toluene sulfonimide, methyl-para-toluene sulfonimide, dimethyl sulfonimide, and the like. Examples of the mineral acids include nitric acid, sulfuric acid, phosphoric acid, poly-phosphoric acid, and the like.

The curable composition may also contain other optional ingredients such as fillers, light stabilizers, pigments, flow control agents, plasticizers, mold release agents, corrosion inhibitors, and the like. It may also contain, as an optional ingredient, a medium such as a liquid medium to aid the uniform application and transport of the curable composition. Any or all of the ingredients of the curable composition may be contacted with the liquid medium. Moreover, the liquid medium may permit formation of a dispersion, emulsion, invert emulsion, or solution of the ingredients of the curable composition. Particularly preferred is a liquid medium, which is a solvent for the curable composition ingredients. Suitable solvents include aromatic hydrocarbons, aliphatic hydrocarbons, halogenated hydrocarbons, ketones, esters, ethers, amides, alcohols, water, compounds having a plurality of functional groups such as those having an ether and an ester group, and a mixture thereof.

Preferably, the weight ratio of the active hydrogen-containing material to the crosslinking composition is in the range of from about 99:1 to about 0.5:1 or about 10:1 to about 0.8:1 or about 4:1 to about 0.8:1.

The weight percent of the cure catalyst, if present, is in the range of from about 0.01 to about 3.0 wt % based on the weight of the crosslinker and active hydrogen-containing material components.

The present coating compositions may employ a liquid medium such as a solvent, or it may employ solid ingredients as in powder coatings, which typically contain no liquids. Contacting may be carried out by dipping, spraying, padding, brushing, rollercoating, flowcoating, curtaincoating, electrocoating or electrostatic spraying.

The liquid or powder coating compositions and a substrate to be coated are contacted by applying the curable composition onto the substrate by a suitable method, for example, by spraying in the case of the liquid compositions and by electrostatic spraying in the case of the powder compositions. In the case of powder coatings, the substrate covered with the powder composition is heated to at least the fusion temperature of the curable composition forcing it to melt and flow out and form a uniform coating on the substrate. It is thereafter fully cured by further application of heat, typically at a temperature in the range of about 120° C. to about 220° C. for a period of time in the in the range of about 5 minutes to about 30 minutes and preferably for a period of time in the range of 10 to 20 minutes.

In the case of the liquid compositions, the solvent is allowed to partially evaporate to produce a uniform coating on the substrate. Thereafter, the coated substrate is allowed to cure at temperatures of about 20° C. to about 150° C., or about 25° C. to about 120° C. for a period of time in the in the range of about 20 seconds to about 30 days depending on temperature to obtain a cured film. In a particularly advantageous embodiment, coating compositions formulated with crosslinker containing compositions of the present invention can be heat cured at lower temperatures preferably ranging from about 20° C. to about 90° C.

The heat cured compositions of this invention may be employed as coatings in the general areas of coatings such as original equipment manufacturing (OEM) including automotive coatings, general industrial coatings including industrial maintenance coatings, architectural coatings, powder coatings, coil coatings, can coatings, wood coatings, and low temperature cure automotive refinish coatings. They are usable as coatings for wire, appliances, automotive parts, furniture, pipes, machinery, and the like. Suitable surfaces include metals such as steel and aluminum, plastics, wood, and glass.

The curable compositions of the present invention are particularly well suited to coat heat sensitive substrates such as plastics and wood which may be altered or destroyed entirely at the elevated cure temperatures prevalent in the heat curable compositions of the prior art.

The present invention will now be illustrated by the following examples. The examples are not intended to limit the scope of the present invention. In conjunction with the general and detailed descriptions above, the examples provide further understanding of the present invention.

EXAMPLES

Example 1

Preparation of Tris(propylol)melamine Mixed Methoxy/Butoxy Ethers

A. Methoxy Resin

In a suitable flask was mixed 126 grams of Melamine (1 mole) with 388 grams of propionaldehyde (6 moles), 750 ml of methanol and 2.5 grams of p-toluenesulfonic acid monohydrate (p-TSA:$H_2O$) as the catalyst. The mixture was heated to 65° C. and kept for 2 hours. The solution was then stripped under vacuum at a temperature less than 60° C. and at a pressure less than 75 mm Hg. Liquid chromatography (LC) showed that the resulting mixture contained bis-substituted in addition to tris(propylol)melamine methyl ether. GPC analysis showed an oligomeric content of about 15%.

B. Methoxy/Butoxy Resin

The product in 1A was mixed with 200 grams of butanol and 2.0 grams of p-TSA:H$_2$O. The mixture was then heated to reflux. When refluxing temperature reached 85° C., the solution was cooled. A filter agent, Celite® 545 from Aldrich® (1 gram) was added, and the salts were filtered off. The resulting foil solid content of the resin was 65.8%. LC analysis showed the product was a mixture of methoxy and butoxy derived from the trans-etherification in butanol.

Example 2

Preparation of Tris(propylol)melamine Mixed Methoxy/Methoxy-2-Propoxy Ethers

The product from IA above was mixed with 300 grams of 1-methoxy-2-propanol and 2.0 grams of p-TSA:H$_2$O. The mixture was then heated to 93° C. for 2 hours. The solution was then cooled and Celite® 545 (1 gram) was added for filtration. The foil solid content of the resin was 55.7%. LC analysis showed the product was a mixture of methoxy and 1-methoxy-2-propoxy derived from the trans-etherification in 1-methoxy-2-propanol.

Example 3C

Preparation of Tris(propylol)melamine Methyl Ether Comparison

In a suitable flask was mixed 12.6 grams of melamine (0.1 mole) with 34.8 grams of propionaldehyde (0.6 moles), 75 ml of methanol and 0.25 grams of p-TSA:H$_2$O. The mixture was heated to 65° C., and kept for 2 hours. The acid catalyst was then neutralized by a caustic solution after the solution was cooled to 50° C. The solution continued to cool to precipitate solids, which were then separated by filtration. The solids had a melting point of 152–154° C.

Example 4C

Preparation of Tris(propylol)melamine Butyl Ether Comparison

In a suitable flask was mixed 12.6 grams of melamine (0.1 mole) with 46.4 grams of propionaldehyde (0.8 moles), 75 ml of butanol and 0.25 grams of p-TSA:H$_2$O. The mixture was heated to 65° C. and kept for 2 hours. The acid catalyst was then neutralized by a caustic solution after the solution was cooled to 50° C. Butanol (30 g) was then added, and the insoluble solids were filtered. The foil solids content of the resin was 54.1%.

Example 5

Reaction of Bis(propylol)melamine Methyl Ether with Glutaraldehyde

A. Preparation of Bis(propylol)melamine Methyl Ether

In a suitable flask was mixed 63 grams of melamine (0.5 mole) with 87 grams of propionaldehyde (1.5 moles), 750 ml of methanol and 2.5 grams of p-TSA:H$_2$O. The mixture was heated to 65° C., and kept for 5 hours. The solution was cooled to ambient temperature. The precipitated solids, which were separated by filtration, had a melting point of 242° C. NMR showed that the compound was bis(propylol) melamine methyl ether.

B. Reaction with Glutaraldehyde

The solid in 5A above (2.7 grams) was mixed with 1.0 gram of a 50% aqueous glutaraldehyde solution, 20 grams of methanol and 10 grams of water. The mixture was heated to reflux for 2 hours and became clear. The volatiles were removed by vacuum distillation to give 6.2 grams of a resin (50% solid).

Examples 6 and 7

Solvent Resistance of Mixed Melamine Ethers Coating Formulations

Coating Compositions containing the crosslinking resins of Examples 1B and 2 were prepared by mixing 40 parts crosslinking resin with 60 parts acrylic backbone resin (Joncryl® 500) and 0.5 parts dimethyl acid pyrophosphate catalyst in butanol. Both formulations were applied on iron phosphate treated cold roll steel panels and baked at 75° C. for 30 minutes. The resulting film thickness was approximately 1 mil. Solvent resistances of the baked films were measured using a methylethyl ketone (MEK) rub. The results are shown in table 1 below.

TABLE 1

| | Solvent resistance | |
|---|---|---|
| Example | Resin Example | MEK Rubs to Remove |
| 6 | 1B | 200+ |
| 7 | 2 | 200+ |

Example 8

Cure Response of Coating Containing the Crosslinking Resin Prepared by Reacting Bis(propylol)melamine Methyl Ether with Glutaraldehyde A coating compositions containing the crosslinking resin of Example 5B was prepared by mixing 50 parts crosslinking resin with 50 parts acrylic backbone resin (Joncryl® 500) and a 0.5 parts dimethyl acid pyrophosphate catalyst in butanol. The formulations were applied on iron phosphate treated cold roll steel panels and baked at 75° C. for 10, 20 and 30 minutes. Solvent resistances of the baked films were measured using a methylethyl ketone (MEK) rub. The results are shown in Table 2 below.

TABLE 2

| | Cure Response | | |
|---|---|---|---|
| Time | 10 minutes | 20 minutes | 30 minutes |
| Film Thickness (mil) | 1.1 | 1.1 | 1.0 |
| MEK rubs to remove | 40 | 120 | 200+ |

Examples 9 and 10

Solvent Resistance of Coatings Containing the Crosslinking Resins of Examples 1B and 4C Coating Compositions containing the crosslinking resins of Examples 1B and 4C were prepared by mixing 40 parts crosslinking resin with 60 parts acrylic backbone resin (Joncryl® 500) and a 0.5 parts dimethyl acid pyrophosphate catalyst in butanol. Both formulations were applied on iron phosphate treated cold roll steel panels and baked at 75° C. for 30 minutes. Solvent resistance of the baked films were measured using a methylethyl ketone (MEK) rub. The results are shown in Table 3 below.

TABLE 3

Solvent resistance

| Example | Resin Example | Film Thickness (mils) | MEK Rubs to Remove |
|---|---|---|---|
| 9 | 1B | 1.0 | 200+ |
| 10 | 4C | 1.1 | 30 |

The results show that the mixed ether melamine resin showed vastly superior results over the tris(propylol) melamine butyl ether melamine comparison.

Attempts were made to prepare a coating composition containing the crosslinking resin of Example 3C (tris (propylol)melamine methyl ether) to compare with the coating composition of Example 9. The resin of Example 3C was added to a number of solvents typically used in the coating industry such as toluene, methyl ethyl ketone, butylacetate, butanol and methanol. High temperatures were required in order to prepare homogenous solutions. However, when the temperature of the mixture was cooled to ambient temperature, the crosslinker resin precipitated from the solution. Therefore, a coating composition containing the resin of Example 3C could not be prepared.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A crosslinking composition comprising a compound having the structure of Formula I:

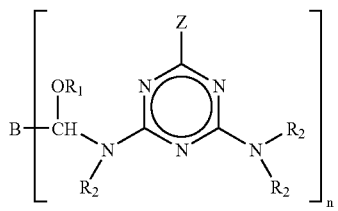

wherein Z is a hydrogen, an alkyl of 1 to about 18 carbon atoms, an aryl of about 6 to about 24 carbon atoms, an aralkyl of about 7 to about 24 carbon atoms, or —NR$_2$R$_2$;

each R$_2$ is independently hydrogen, an alkyl, aryl or an aralkyl of 1 to about 18 carbon atoms or R$_3$;

wherein R$_3$ is —CHROR$_1$, or

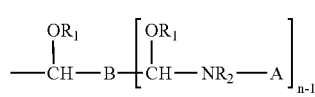

wherein R is alkyl, halogenated alkyl, aryl, aralkyl, halogenated aralkyl, alkoxyalkyl or an alkaryl, having from 1 to about 24 carbon atoms; R$_1$ is a hydrogen, alkyl, aryl, aralkyl, alkoxyalkyl or an alkaryl having from 1 to about 24 carbon atoms; and wherein the alkyl or aryl groups in each radical may optionally have heteroatoms in their structure;

B is a residue of a poly(alkylaldehyde) with n aldehyde groups;

n is an integer of 2 to about 8;

A is an amino moiety derived from the group consisting of guanamines and melamines.

2. The composition of claim 1, wherein said compound having the Formula I is an oligomer having an number average molecular weight of from about 500 to about 5000.

3. A crosslinking composition comprising a compound having the structure of Formula II:

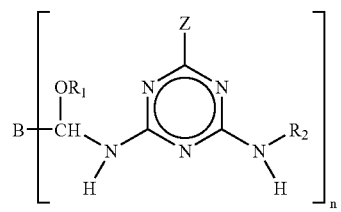

wherein Z is a hydrogen, an alkyl of 1 to about 18 carbon atoms, an aryl of 6 to about 24 carbon atoms, an aralkyl of 7 to about 24 carbon atoms, or —NHR$_2$;

each R$_2$ is independently hydrogen, an alkyl, aryl or an aralkyl of 1 to about 18 carbon atoms or R$_3$;

wherein R$_3$ is —CHROR$_1$, or

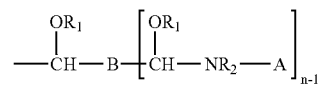

wherein R is alkyl, halogenated alkyl, aryl, aralkyl, halogenated aralkyl, alkoxyalkyl or an alkaryl having from 1 to about 24 carbon atoms; R$_1$ is a hydrogen, alkyl, aryl, aralkyl, alkoxyalkyl or an alkaryl having from 1 to about 24 carbon atoms; and wherein the alkyl or aryl groups in each radical may optionally have heteroatoms in their structure;

B is a residue of a poly(alkylaldehyde) with n aldehyde groups;

n is an integer of 2 to about 8;

A is an amino moiety derived from the group consisting of guanamines and melamines.

4. The composition of claim 3, wherein said compound having the Formula II is in the form of an oligomer having an number average molecular weight of from about 500 to about 5000.

5. The crosslinking composition of claim 3, wherein R$_1$ is derived from an alcohol selected from the group consisting of: methanol, ethanol, propanol, isopropanol, butanol, isobutanol, cyclohexanol, phenol, benzyl alcohol, monoalkyl ether of ethylene or propylene glycol and mixtures thereof.

6. The crosslinking composition of claim 3, wherein Z is —NHR$_2$, an alkyl of 1 to about 8 carbon atoms or an aryl of 6 to about 24 carbon atoms.

7. The crosslinking composition of claim 3, wherein B is derived from glutaraldehyde, the reaction products of crotonaldehyde and polyhydritic alcohols or adducts and polymers of α,β-unsaturated aldehydes.

8. The crosslinking composition of claim 6, wherein R is C$_1$ to C$_8$ alkyl and R$_1$ is a C$_1$ to C$_8$ alkyl or a C$_1$ to C$_8$ alkoxyalkyl.

9. The crosslinking composition of claim 1, wherein about 10% to about 90% of the $R_2$ groups on a molar basis are —CHROR$_1$.

10. The crosslinking composition of claim 3, wherein $R_1$ is derived from methanol, butanol, monomethyl ether of ethylene glycol or monomethyl ether of propylene glycol.

11. A crosslinking composition comprising a compound having the structure of Formula III:

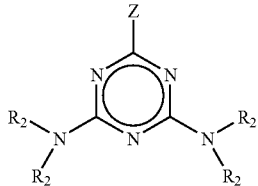

wherein Z is a hydrogen, an alkyl of 1 to about 18 carbon atoms, an aryl of 6 to about 24 carbon atoms, an aralkyl of 7 to about 24 carbon atoms, or —NR$_2$R$_2$;

each $R_2$ is independently hydrogen, an alkyl, aryl or an aralkyl of 1 to about 24 carbon atoms or $R_3$;

$R_3$ is —CHROR$_1$; wherein $R_1$ is hydrogen, alkyl, aryl, aralkyl, or an alkaryl having from 1 to about 24 carbon atoms; and R is ethyl, or an aryl, aralkyl, halogenated aralkyl, alkoxyalkyl or an alkaryl having from 1 to about 24 carbon atoms;

wherein the alkyl or aryl groups in each radical may optionally have heteroatoms in their structure and with the provisos that at least some $R_1$ groups are derived from a mixture of two or more alcohols and at least one $R_2$ is $R_3$.

12. A crosslinking composition comprising the structure of formula:

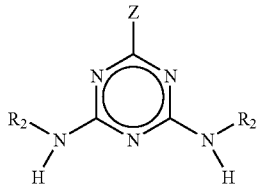

wherein Z is a hydrogen, an alkyl of 1 to about 18 carbon atoms, an aryl of 6 to about 24 carbon atoms, an aralkyl of 7 to about 24 carbon atoms, or —NHR$_2$;

each $R_2$ is independently hydrogen, an alkyl, aryl or an aralkyl of 1 to about 24 carbon atoms or $R_3$;

$R_3$ is —CHROR$_1$; wherein $R_1$ is hydrogen, alkyl, aryl, aralkyl or an alkaryl having from 1 to about 24 carbon atoms; and R is ethyl, or an aryl, aralkyl, halogenated aralkyl, alkoxyalkyl or an alkaryl having from 1 to about 24 carbon atoms;

wherein the alkyl or aryl groups in each radical may optionally have heteroatoms in their structure and with the provisos that at least some $R_1$ groups are derived from a mixture of two or more alcohols and at least one $R_2$ is $R_3$.

13. The crosslinking composition of claim 12, wherein R is ethyl.

14. The crosslinking composition of claim 13, wherein $R_1$ is derived from two or more alcohols selected from the group consisting of: methanol, ethanol, propanol, isopropanol, butanol, isobutanol, cyclohexanol, phenol, benzyl alcohol, monoalkyl ether of ethylene or propylene glycol and mixtures thereof.

15. The crosslinking composition of claim 13, wherein about 10% to about 90% of the $R_2$ groups on a molar basis are $R_3$.

16. The crosslinking composition of claim 13, wherein Z is –NHR$_2$, an alkyl of 1 to 8 carbon atoms or an aryl of 6 to 24 carbon atoms.

17. The crosslinking composition of claim 16, wherein $R_1$ is a $C_1$ to $C_8$ alkyl or a $C_1$ to $C_8$ alkoxyalkyl.

18. A crosslinking composition comprising an oligomer compound having the Formula IV:

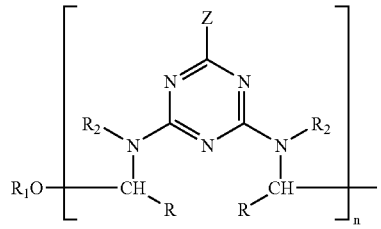

wherein Z is hydrogen, an alkyl of 1 to about 18 carbon atoms, an aryl of 6 to about 24 carbon atoms, an aralkyl of 7 to about 20 carbon atoms, or –NR$_2$R$_2$;

each $R_2$ is independently hydrogen, an alkyl, aryl or an aralkyl of 1 to about 24 carbon atoms or $R_3$;

$R_3$ is –CHROR$_1$; wherein $R_1$ is hydrogen, an alkyl, aryl, aralkyl, or an alkaryl having from 1 to about 24 carbon atoms and R is ethyl, aryl, aralkyl, halogenated aralkyl, alkoxyalkyl or an alkaryl having from 1 to 24 carbon atoms;

n is 2 to about 50;

wherein the alkyl or aryl groups in each radical may optionally have heteroatoms in their structure and with the provisos that at least some R groups are derived from a mixture of two or more alcohols and at least one $R_2$ is $R_3$.

19. A crosslinking composition comprising an oligomer compound having the Formula V:

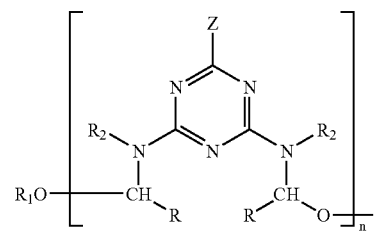

wherein Z is a hydrogen, an alkyl of 1 to about 18 carbon atoms, an aryl of 6 to about 24 carbon atoms, an aralkyl of 7 to about 24 carbon atoms, or —NR$_2$R$_2$;

each $R_2$ is independently hydrogen, an alkyl, aryl or an aralkyl of 1 to about 18 carbon atoms or $R_3$;

$R_3$ is —CHROR$_1$; wherein $R_1$ is hydrogen, an alkyl, aryl, aralkyl, or an alkaryl, having from 1 to about 24 carbon atoms and R is ethyl, aryl, aralkyl, halogenated aralkyl, alkoxyalkyl or an alkaryl, having from 1 to about 24 carbon atoms;

n is 2 to about 50;

wherein the alkyl or aryl groups in each radical may optionally have heteroatoms in their structure and with the provisos that at least some $R_1$ groups are derived from a mixture of two or more alcohols and at least one $R_2$ is $R_3$.

* * * * *